June 15, 1926.

N. A. CHRISTENSEN

AIR BRAKE CONTROL VALVE MECHANISM

Filed March 8, 1924   2 Sheets-Sheet 1

1,588,656

INVENTOR.
NIELS A. CHRISTENSEN
BY
Quarles & French
ATTORNEYS.

June 15, 1926.
N. A. CHRISTENSEN
1,588,656
AIR BRAKE CONTROL VALVE MECHANISM
Filed March 8, 1924    2 Sheets-Sheet 2
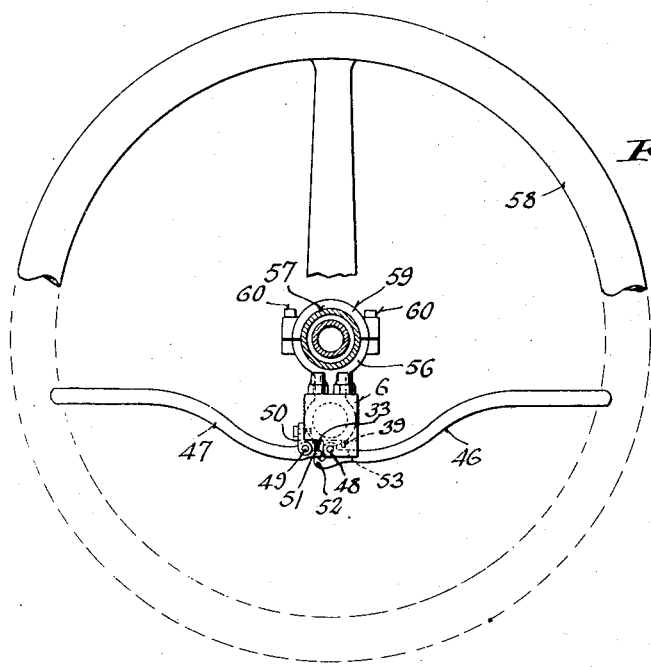
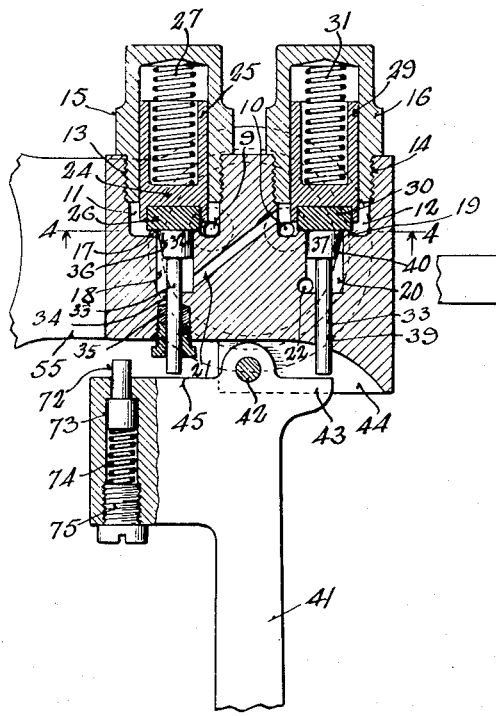
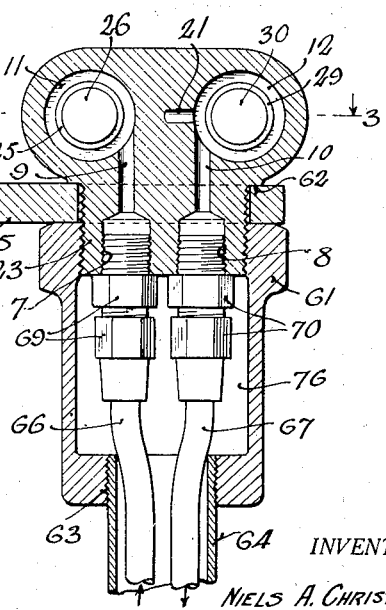
INVENTOR.
NIELS A. CHRISTENSEN
BY
Quarles & French
ATTORNEYS.

Patented June 15, 1926.

1,588,656

UNITED STATES PATENT OFFICE.

NIELS A. CHRISTENSEN, OF MILWAUKEE, WISCONSIN.

AIR BRAKE-CONTROL-VALVE MECHANISM.

Application filed March 8, 1924. Serial No. 697,812.

This invention relates to valves, and more particularly to air-brake-control valve mechanism for braking systems for automotive vehicles.

One of the objects of this invention is to provide an air-brake-control valve mechanism and its connections so associated with the steering column and steering wheel of an automotive vehicle as to be readily manipulated by the operator of the vehicle.

A further object of the invention is to provide an air-brake-control valve by which the operator may readily control the braking pressure.

A further object of the invention is to provide an air-brake-control valve of few parts that are readily accessible for the purpose of inspection or removal.

The invention further consists in the several features hereinafter set forth and more particularly defined by claims at the conclusion hereof.

Figure 1:
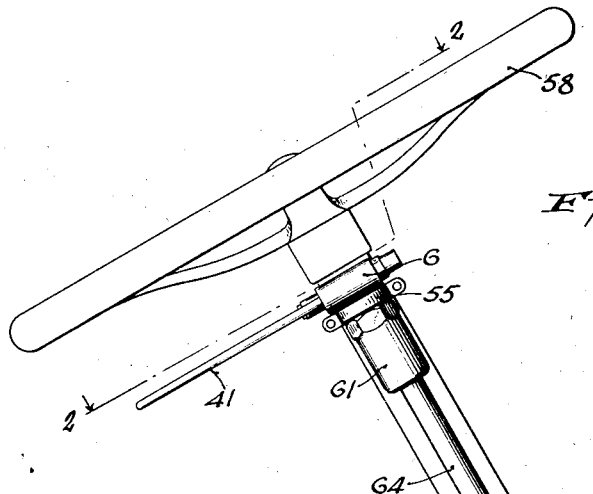
Figure 2:
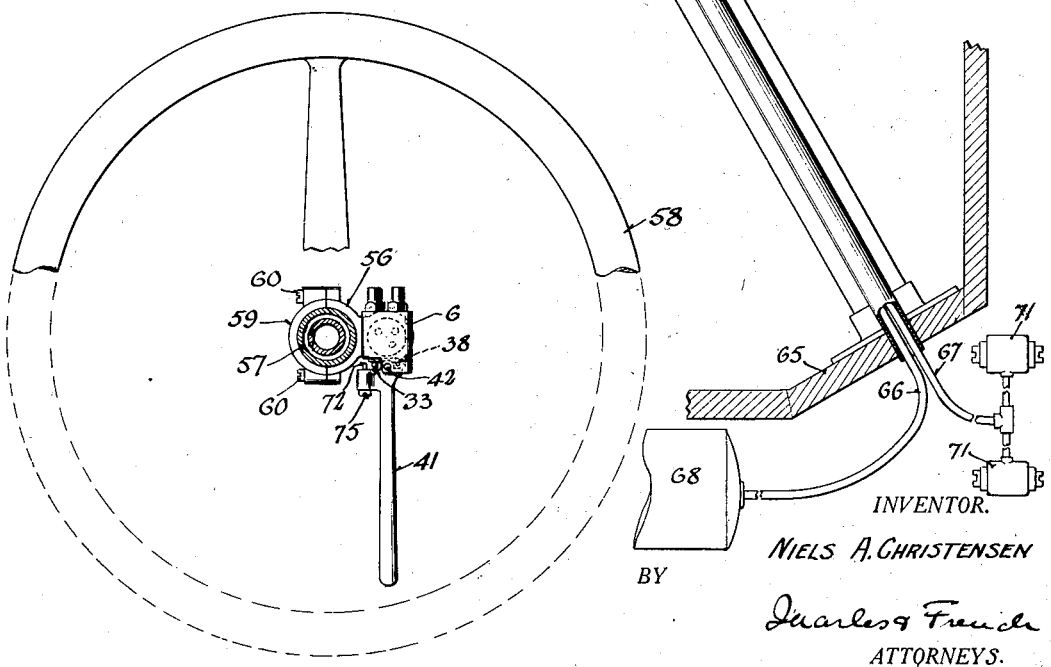

In the drawings: Fig. 1 is an elevation view of a valve and its mounting embodying the invention; Fig. 2 is a section taken on the line 2—2 of Fig. 1; Fig. 3 is a detail sectional view of the control valve taken on on the line 3—3 of Fig. 4; Fig. 4 is a detail sectional view of the control valve taken on the line 4—4 of Fig. 3; Fig. 5 is a view similar to Fig. 2 of the control valve embodying the invention, adapted for control by either hand.

Referring to Figs. 3 and 4, the valve includes a casing 6 having tapped openings 7 and 8 therein from which ducts 9 and 10, respectively, lead to valve chambers 11 and 12. These chambers have tapped openings 13 and 14 receiving the lower threaded end of box-nuts 15 and 16 which seal off the upper ends of said chambers.

A rounded or beaded valve seat 17 is formed in the lower end of the chamber 11 adjacent a duct 18, and a rounded or beaded valve seat 19 is formed in the lower end of the chamber 12 adjacent a duct 20. A duct 21 connects the duct 18 with the chamber 12. A relief duct 22 extends from the duct 20 into the lower threaded end 23 of the casing from which it has its outlet in a coupling member 61.

A poppet valve 24 has a tubular portion 25 slidably mounted in the bore of the nut 15 and has a head 26 of composition material inset therein and held against the seat 17 by a spring mounted in the bore of the portion 25 and interposed between the end of said bore and the upper end of the bore in the nut 15. A poppet valve 28 has a tubular portion 29 slidably mounted in the bore of the nut 16 and has a head 30 of composition material inset therein and held against the seat 19 by a spring 31 mounted in the bore of the portion 29 and interposed between the end of said bore and the upper end of the bore in the nut 16.

A push pin 32 is slidably mounted in the bore formed by the duct 18 and has a stem portion 33 mounted in a reduced bore 34, which is preferably packed by a suitable stuffing-box 35, said stem projecting outside of the valve casing. The head of this pin engages the head 26 of the valve 24 and fits closely in the bore with the exception of a wedge-shaped flat spot 36 which gradually increases the effective port opening as this pin is pushed in toward the valve 24 by the application of the brake handle or other operating means.

A push pin 37 is slidably mounted in the bore formed by the duct 20 and has a stem portion 38 mounted in a reduced bore 39, said stem projecting outside of the valve casing. The head of this pin engages the head 30 of the valve 28 and fits closely in the bore with the exception of a wedge-shaped face 40 which gradually increases the effective port opening as this pin is pushed in toward the valve 28 by application of the brake handle or other operating means.

The poppet valves 24 and 28, nuts 15 and 16, springs 27 and 31 and pins 32 and 37 are preferably interchangeable to facilitate manufacture and assembly.

The operating means shown in Fig. 3 consists of a lever 41 pivotally mounted on a suitable pivot-pin 42 on the casing 6 and having a part 43 working in a slot 44 in said casing and adapted to engage the exposed end of the stem 38 and another part 45 adapted to engage the exposed end of the stem 33. As the pivotal point of the lever is between the stems, swinging the lever in one direction from its neutral position causes it to move one of the push-pins and open the valve associated therewith, and swinging said lever in the opposite direction from its neutral position causes said lever to move the other push-pin to open the valve associated therewith.

The operating means shown in Fig. 5 includes a pair of levers 46 and 47 so associated that the operation of either one will operate the control valve. The lever 46 is mounted on a pivot-pin 48 between the exposed ends of the push-pins, while the lever 47 is mounted on a pivot-pin 49 carried by a bracket 50 secured to the casing 6. The lever 47 has a part 51 engageable with the stem 33 and the lever 46 a part 52 engageable with the part 51, and a part 53 engageable with the stem 38 whereby the swinging of either lever in the proper direction serves to push in the stem 33 or stem 38, because the lever 47 acts directly upon the stem 33 and the lever 46 acts through the part 51 on said stem 33, and the lever 46 acts directly on the stem 38 and the lever 47 acts through engagement of the parts 51 and 52 to move the lever 46 to actuate the stem 38.

The threaded portion 23 is mounted in and extends through an opening 54 in a bracket arm 55 which has a semi-cylindrical portion 56 clamped to the steering column 57 just below the steering wheel 58 by a semi-cylindrical member 59 and bolts 60, with either arrangement of operating means, Figs. 1 and 2 showing the valve mounted in the steering column and equipped with the single lever 41, while Fig. 5 shows said valve mounted on the steering column and equipped with the two levers. The two-lever arrangement permits the operator to keep one hand on the steering wheel while operating the control valve with his other hand.

The casing 6 is securely clamped to the arm 55 by a pipe-coupling member 61 which has a threaded end to engage the threaded end 23 of the casing 6 and to clamp the bracket between it and a shoulder 62 on the casing 6. The member 61 has a threaded opening 63 at its lower end receiving the threaded end of an enclosing tube 64 which parallels the steering column and extends down beneath the foot-board 65 of the vehicle. This tube 64 and the member 61 enclose and protect the small pipes 66 and 67 of the brake system through which the compressed air is conducted. The pipe 66 is connected to a compressed air supply tank 68 and extends up through the tube 64 and has a coupling 69 connecting it with the tapped opening 7. The pipe 67 is connected by a suitable coupling 70 with the tapped opening 8, extends down through the tube and forms a supply line to furnish compressed air to the piston or pistons, not shown, in the brake cylinders 71. As the control herein shown is applicable to any fluid-pressure-operated braking system for vehicles, the details of the brake-applying mechanism and its association with the wheel or wheels of the vehicle have not been shown herein. Reference, however, to the brake-applying mechanism shown and described in my co-pending application Serial No. 696,200, filed March 1, 1924, may here be made to show one form of brake-applying mechanism.

With the construction above described, when the operator swings the lever 41 or either of the levers 46 or 47 so as to push the stem 33 of the pin 32 inwardly to unseat the valve 24, compressed air from the tank 68 flows through pipe 66 to chamber 11, thence through ducts 18 and 21 to chamber 12 and thence through duct 10 to the pipe 67 and to the brake cylinders, such as the cylinders 71. The application of the air to the brake cylinders may be gradually made by the gradual lifting of the valve 24 as the wedge-shaped port formed by part 36 of said pin and its position relative to the seat 17 regulates the rate of discharge of the air, the rapidity of discharge increasing as the pin is moved farther in and decreasing as the valve closes. The stuffing-box 35 is provided to prevent the air at brake-cylinder pressure from escaping during the period of application. As a further control of the braking pressure, a spring abutment or stop is provided either in the valve casing or, as shown in Fig. 3, connection with the handle 41 comprising a stop-pin 72 slidably mounted in a bore 73 and urged outwardly by a spring 74 interposed between the enlarged end of the pin and a screw-plug 75. With this construction, the movement of the operating-handle from neutral position to a position in which the pin 72 engages the casing will move the pin 32 to such an extent as to produce a port opening to cause an ordinary or service application of the brakes and the abutment retards the operation of the handle to such an extent that the operator can feel when this limit is reached. Then, by pulling the handle further into application position, this stop-pin 72 will move relative to the handle against the pressure of the spring 74 and the valve 24 will be opened further thereby establishing a larger port opening by the then position of the face 36 on pin 32 relative to the seat 17, and this will provide what might be termed an emergency application, which would represent the greatest rapidity with which the compressed air can be passed from the reservoir through the valve opening and into the pipe line to the brake cylinders, which full opening, in practice, will be equivalent to the full diameter of the conducting pipe. While the spring abutment is more particularly shown in connection with handle 41, it may be similarly associated with either one of the handles 47 or 46 to provide a feeler for the operator in making a service or emergency application of the brakes.

On a return of the handle 41 or the handles 47, 46 to neutral position, the valve 24 closes and release of air from the brake system is effected when the operator swings the lever 41 or either of the levers 46 or 47 so as to push the stem 38 of the pin 37 inwardly to unseat the relief valve 29, whereupon the high pressure air in the system passes from the brake cylinders 71 through pipe 67 to chamber 12, duct 20 and release duct 22 which discharges into the space in the coupling 61 and passes down through the tube 64 and is discharged therefrom at its lower end beneath the foot-board 65 of the vehicle. The release of the air may also take place gradually by the regulation by the operator of the extent of movement of the pin 37.

The operating handle or handles are returned to a neutral position when released by the operator by either of the pins 32 or 37 which are normally urged to an outward position by the springs 27 and 31.

The pressure valves 24 and the relief valve 28 may be readily inspected by unscrewing the nuts 15 and 16 from the casing and the heads 26 and 30 may then be readily replaced by new heads, if necessary.

I desire it to be understood that this invention is not to be limited to any specific form or arrangement of parts except in so far as such limitations are specified in the claims.

What I claim as my invention is:—

1. In an air-brake-control valve mechanism, the combination of a casing having an inlet passage for compressed air from a source of supply and an outlet passage to the brake system, a normally closed poppet valve controlling the passage of compressed air from said inlet passage to said outlet passage, an operating pin for said valve in said outlet passage and engageable with the head thereof and provided with means for regulating the passage of air to said outlet passage, and means for operating said pin.

2. In an air-brake-control valve mechanism, the combination of a casing having an inlet passage for compressed air from a source of supply and an outlet passage to the brake system, a normally closed poppet valve controlling the passage of compressed air from said inlet passage to said outlet passage, an operating pin in said outlet passage and having a part adjacent the seat of the valve for gradually increasing the port opening to said outlet passage as said pin is moved inwardly during the opening of said valve, and means for operating said pin.

3. In an air-brake-control valve mechanism, the combination of a casing having an inlet passage for compressed air from a source of supply and an outlet passage to the brake system, a normally closed poppet valve controlling the passage of compressed air to said outlet passage, and means in said outlet passage for opening said valve and regulating the amount of compressed air passing to said outlet.

4. In an air-brake-control valve mechanism, the combination of a casing having valve chambers therein with air passages leading therefrom, housing members removably mounted at the exterior ends of said chambers and provided with bores, valves controlling the passage of air through said passages, each valve including a hollow tubular valve stem slidably mounted in each of said bores and a valve head in each stem, a spring within the bore of each stem and its associated housing member to normally hold the valve closed, said casing having an inlet passage for conducting compressed air to one of said chambers, and an outlet passage from the other chamber to the brake system, the valve-controlled passage leading from the chamber in communication with said inlet extending to said other chamber, the passage leading from said chamber in communication with said outlet being a relief passage, operating pins for said valves engageable with the heads thereof and having stems operable from outside the casing, and means for operating said pins.

5. The combination with a steering column and steering wheel of an automotive vehicle, of air-brake-control valve mechanism mounted on said column below and adjacent said wheel including inlet and exhaust valves and a pair of operating handles either one of which may be moved by the operator to operate said valves whereby the operator may operate said control mechanism with either hand while using the other hand on the steering wheel.

6. In an air-brake-control valve mechanism, the combination of a valve for controlling the passage of compressed air to the brake system, means for regulating the amount of air passing into said brake system on the opening of said valve, means including a lever for operating said valve, and a yieldable abutment for said lever associated with said regulating means for indicating to the operator when a service application has been made.

7. In an air-brake-control valve mechanism, the combination of a valve for controlling the passage of compressed air to the brake system, means for regulating the amount of air passing into said brake system on the opening of said valve whereby a service or emergency application of air to the braking system may be made, and means associated with the valve-operating means for indicating to the operator when a service application has been made.

8. The combination with the steering column and steering wheel of an automotive vehicle, of air-brake-control-valve mechanism mounted on said column adjacent said wheel including inlet and exhaust valves, and a pair of oppositely disposed operating handles pivotally mounted on the casing and each directly associated with one of said valves and indirectly associated with the other of said valves through the other handle whereby the operation of either handle operates said valves.

9. The combination with the steering column and steering wheel of an automotive vehicle, of air-brake-control-valve mechanism mounted on said column adjacent said wheel, including inlet and exhaust valves, and a pair of oppositely disposed operating levers pivotally mounted on the casing and each directly associated with one of said valves and having abutting contact with each other for operating the other valve whereby the actuation of either lever serves to operate said valves.

In testimony whereof I affix my signature

NIELS A. CHRISTENSEN.